Figure 1:
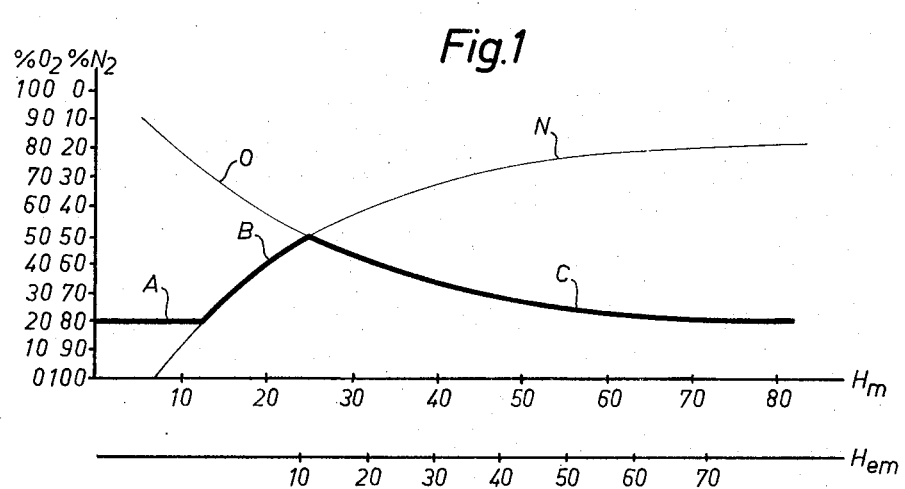

United States Patent [19]
Fahlman et al.

[11] 3,788,311
[45] Jan. 29, 1974

[54] TUBULAR DIVING EQUIPMENT

[75] Inventors: Gösta H. Fahlman, Tsawwassen, British Columbia, Canada; Gunnar Lundborg, Vallingby; Johan Eric Hayden, Westberg, Lidingo, both of Sweden

[73] Assignee: AGA Aktiebolag, Sweden

[22] Filed: Oct. 4, 1971

[21] Appl. No.: 186,258

[30] Foreign Application Priority Data
Oct. 15, 1970 Sweden.............................. 13944/70

[52] U.S. Cl.............................. 128/142.3, 137/98
[51] Int. Cl........................... A62b 7/02, B63c 11/14
[58] Field of Search .. 128/142, 142.2, 142.3, 145.5, 128/145.6, 145.7, 145.8, 188; 137/97, 98, 114

[56] References Cited
UNITED STATES PATENTS

| | | | |
|---|---|---|---|
| 3,605,785 | 9/1971 | Dobritz | 137/98 |
| 3,669,134 | 6/1972 | Dobritz | 128/145.8 |
| 3,429,326 | 2/1969 | Arnell | 137/98 |
| 3,693,653 | 9/1972 | Cramer | 137/98 |
| 3,593,735 | 7/1971 | Reiher | 128/142 |
| 3,524,444 | 8/1970 | Ellard | 128/142 |

*Primary Examiner*—Richard A. Gaudet
*Assistant Examiner*—G. F. Dunne
*Attorney, Agent, or Firm*—Larson, Taylor and Hinds

[57] ABSTRACT

A tubular diving equipment for diving in water and providing the diver with a gas mixture consisting of a main gas and an auxiliary gas. Different gas mixtures may be considered as breathing gas depending on the diving depth. Said diving equipment has a manually controllable pressure regulator for the main gas and a pressure regulator for the auxiliary gas being controlled by the pressure of the main gas at the outlet of the main gas pressure regulator. The outlets on the respective pressure regulators are connected to a gas mixer chamber via a pressure equalizer. Between said mixer chamber and said pressure equalizer is an automatic control valve connected controlling the pressure of the gas mixture. An automatic correction of the mixing ratio for different depth of diving is obtained.

6 Claims, 3 Drawing Figures

3,788,311

TUBULAR DIVING EQUIPMENT

The present invention relates to tubular diving equipment of the type which provides the diver with a gas mixture consisting of a main gas and an auxiliary gas. Equipment of this type requires a manually controllable pressure regulator intended for the pressure adjustment of the main gas and a pressure regulator intended for the auxiliary gas, which is controlled by the pressure of the main gas at the outlet of the main gas pressure regulators. The outlets on the respective pressure regulator are connected to a gas mixer via a pressure equalizer.

By means of such equipment the flow of breathing gas to the diver is regulated. Different gas mixtures may be considered as breathing gas depending on the depth of descending of the diver. Thus normal air is fed to a descending depth of 10 metres and thereafter air with more or less admixture of oxygen. Other gases too, such as helium, may be considered for deep diving, when oxygen + helium are used as the main gas. Variations in the air flow supplied to the diver have been achieved until now with the help of a pressure regulator with manually controlled pressure adjusting screw or with automatically operating dosing device. A disadvantage of these known equipments consists in that a constant flow is not obtained.

Diving in water brings with it the requirement that the gas the diver breathes has a higher pressure than normal. When air is used this leads to a limitation in diving efficiency, since the ascent has to take place in stages after prolonged diving deeper than 10 m. It is known that through the use of air oxygen mixture, the oxygen concentration of which can be varied with the depth of diving, the efficiency can be increased.

Thus scientific experiments have shown that the nitrogen from the atmosphere is dissolved in blood in a quantity which is a function of the time. The saturation value is proportional to the current partial pressure. As the pressure is lowered when the diver rises up to the surface, the gas will be removed from the blood. If the partial pressure of the nitrogen has been too high (1.6 atm. absolute pressure) and the ascent is too fast, gas bubbles are formed in the blood vessels which lead to paralysis (divers' sickness).

To prevent this, an ascent in stages had to be adopted so as to give the nitrogen the opportunity to be eliminated gradually.

The effect of the nitrogen on the diving can be wholly or partly eliminated through the addition of an auxiliary gas, such as oxygen, to the air, which leads to a reduced partial pressure of nitrogen. The method is limited in that the diver can be poisoned (cramps — oxygen poisoning), when the partial pressure of the oxygen exceeds 1.8 atm. absolute pressure. For this reason the effect of the nitrogen can be wholly eliminated only to a diving depth of 24 metres, whilst beyond this, because of the risk of oxygen poisoning, ascent in stages has to be accepted — though to a lesser extent than if pure air is used.

This admixture of oxygen according to these studies has to be done with different mixing ratios for different depths of diving. One object of the present invention has been therefore to accomplish an automatic mixing-in of oxygen as a function of the actual depth of diving.

The abovementioned disadvantage can be overcome by providing a tubular diving equipment with an automatic control valve connected between the pressure equalizer and the gas mixer for main and for auxiliary gas respectively, which is controlled by the pressure of the gas mixture. In this manner an automatic correction of the mixing ratio for different depth of diving is obtained.

Since the main gas (air) has to be supplied permanently to the diver, an equipment has been provided in a further development of the invention with a direct connection with throttle for the main gas between the pressure equalizer and the gas mixer.

Figure 2:
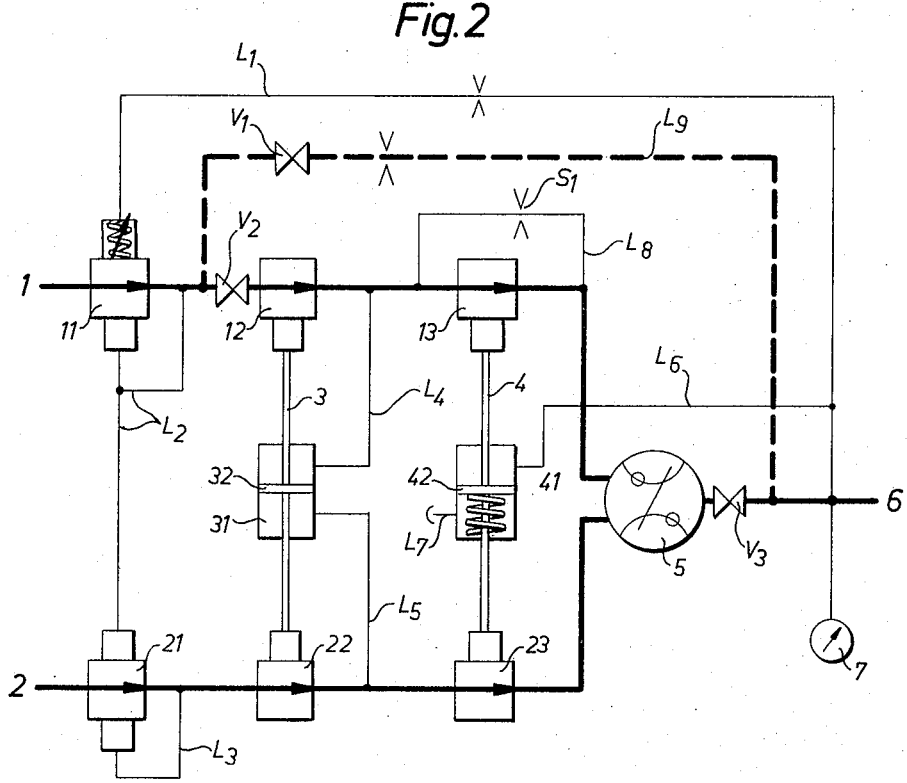
Figure 3:
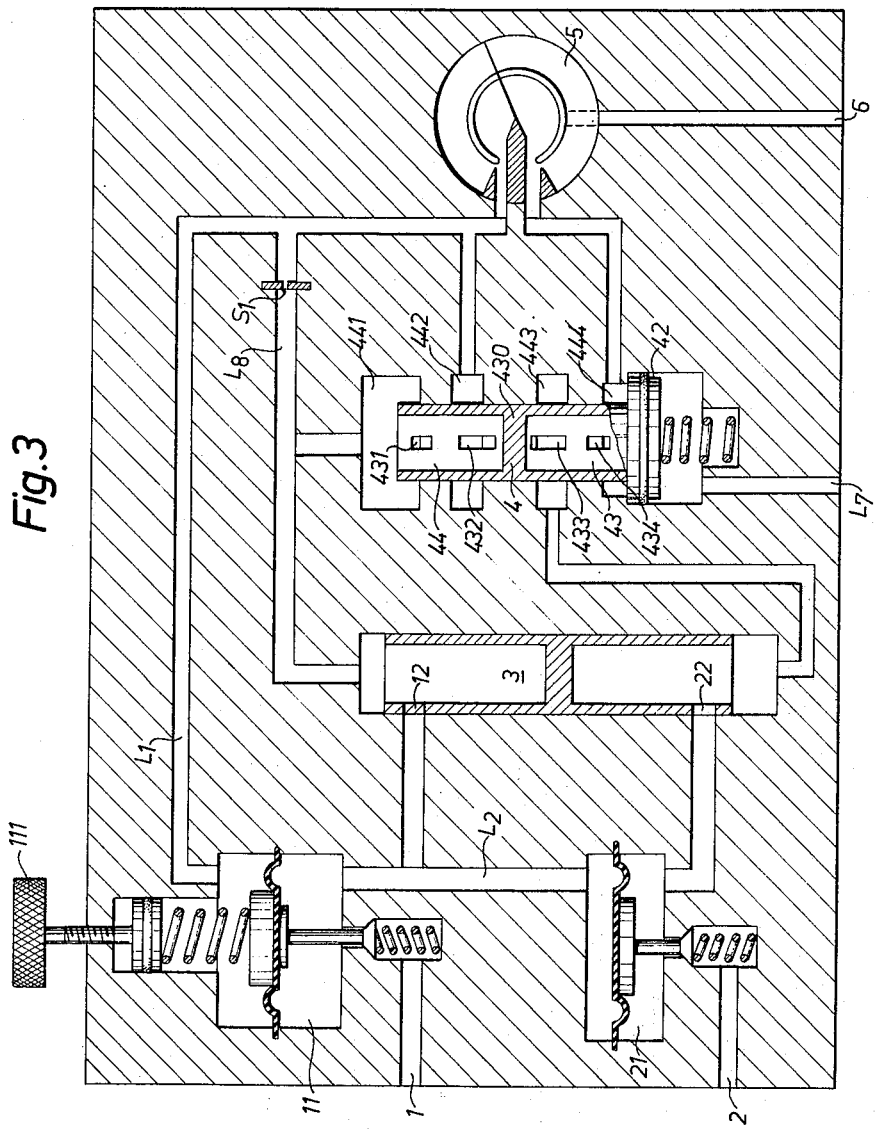

The invention will be illustrated further in the following with reference to the enclosed drawings, in which FIG. 1 shows a diagram concerning the $O_2/N_2$ mixture as a function of the depth of diving, FIG. 2 shows schematically a preferred embodiment of the invention, and FIG. 3 shows a section through a working equipment in accordance with the invention.

In the diagram shown in FIG. 1, which relates to the $O_2/N_2$ mixtures (Y-axis) as a function of the depth of diving (X-axis $H_m$), a curve O has been put down, which indicates the maximum $O_2$ concentration without oxygen poisoning and a curve N which indicates the maximum $N_2$ concentration without ascent in stages.

In the diagram has also been plotted a curve (heavy line) giving the optimum utilization of $O_2/N_2$ mixtures. This curve can be divided into three sections:

1. A section A for diving depth 0 – 10 m. Here it is appropriate to use air, since it is cheapest and does not involve any physiological problem.
2. A section B for diving depth 10 – 25 metres. Here the $O_2$ content in the gas mixture is increased so as to avoid ascent in stages.
3. A section C for diving depth 24 – 75 m. Within this range oxygen is decreased to the air to the extent as the curve O for maximum $O_2$ content without oxygen poisoning permits. Ascent in stages has to be resorted to in the case of prolonged diving periods, but is limited by comparison with the case when only air is used.

The required times for ascent in stages are given in various literature tables. They are specified for example in the "Decompression tables for diving with air" issued by Vattenfallsverket and in the corresponding tables published by the US Navy "Air Decompression Tables 1958."

When the diving is carried out according to the curve ABC in FIG. 1, the times given in the said tables can be considerably reduced. We have put down in the diagram according to FIG. 1 an axis $H_{em}$ for the equivalent depths of diving, which can be used to obtain these times. At diving, for example, to 40 m, if curve C is utilized, the ascent in stages corresponding to the table values for 30 m can be carried out.

As an example of the times gained with the diving method according to the invention, we assume a dive to 25 m with 1 hour sojourn at this depth. The ineffective time (time of ascent in stages) will then be:

| Dive performed with | air only | gas mixture according ABC curve |
|---|---|---|
| 1st dive | 26 minutes | 0 |
| 2nd dive same day | 101 minutes | 0 |

In FIG. 2 is shown a block diagram relating to a preferred embodiment of the invention. At 1 the main gas is supplied which normally consists of air from a compressor or air tank and at 2 is introduced the auxiliary gas which will normally be constituted of oxygen from an oxygen tank. The air is passed via a manually adjustable pressure controller 11 and one side 12 of a pressure equalizer 3 to an air valve 13 belonging to a control valve 4. From the air valve 13 the air is passed on to a gas mixer 5. The oxygen is passed via a pressure controller, described in detail further down, and the other side 22 of the pressure equalizer 3 to an oxygen valve 23 of the control valve 4. From the oxygen valve 23 the oxygen is passed on to the gas mixer 5, in which the main gas (air) and the auxiliary gas (oxygen) are mixed and carried, via the outlet 6, to the diver.

The pressure controller 11 for air, as mentioned before, is manually controllable and is intended for adjustment of the flow. It is also acted upon by the pressure of the outgoing gas mixture via the line $L_1$ for control of the air supply in accordance with the consumption by the diver. The pressure controller 21 for the oxygen is controlled by the air pressure prevailing at the outlet of the pressure controller 11 in such a manner, that the oxygen cannot by itself be fed to the diver. This control is carried out via the lines $L_2$ which also acts upon the pressure controller 11 in opposite direction to the gas mixture pressure from the line $L_1$. Through the line $L_3$ the oxygen pressure acts upon the pressure controller 21 at the outlet of the same in opposite direction to the air pressure in the lines $L_2$.

The pressure equalizer 3 has a cylinder 31 with piston 32 on the one side of which acts the air pressure via the line $L_4$ and on the other side of which acts the oxygen pressure via the line $L_5$. The piston 32 is connected with the valves 12 and 22 on both sides of the pressure equalizer 3 for compensation of the gas pressure.

The control valve 4 in this embodiment consists of a cylinder 41 with piston 42, upon the one side of which acts the gas mixture pressure via the line $L_6$ and on the other side of which acts the atmospheric pressure surrounding the equipment via the line $L_7$ together with a spring force. The piston 42 is connected with air and oxygen valves 13 and 23 respectively for automatic adjustment of the mixing ratio in the gas mixture depending on the pressure of the gas mixture at the outlet 6, that is to say the depth of the diver assumed at the particular time.

Since air will be supplied permanently to the diver a certain constant amount of air is led past the air valve 13 in the control valve 4. This is done via a line $L_8$ with a throttle $S_1$.

The depth assumed by the diver can be read off the gauge 7 calibrated in metres connected to the outlet 6.

If for any reason the equipment fails to function, or if it is only intended to supply air to the diver, a feed line $L_9$ indicated in broken lines in FIG. 2 can be coupled to the valve $V_1$. The valves $V_2$ and $V_3$ present in the air and gas-mixture lines are then suitable blanked off.

In FIG. 3 is shown an operating unit built up in accordance with a somewhat modified form of realization of the tubular diving equipment shown schematically in FIG. 2. The same reference numerals are used for corresponding parts of FIGS. 2 and 3. As can be seen from FIG. 3 the pressure controllers 11 and 21 are constituted as diaphragm controllers, the controller 11 being acted upon in one direction by incoming air from the inlet 1 and by a spring force, and in opposite direction by the spring force adjustable from the outside by the handwheel 111 and the gas pressure in the line $L_1$. The gas pressure in the line $L_1$ is proportional to the gas pressure at the outlet 6, which is linked to the diver. The controller 21 is acted upon in one direction by the oxygen pressure from the inlet 2 and by a spring force, and in opposite direction by the air pressure at the outlet of the controller 12 via the line $L_2$.

The control valve 4 is constituted in this embodiment by the spring-loaded piston 42, the spring-load of which is on the same side as the opening or line $L_7$ to the surrounding atmosphere. On the other side of the piston 42 is a tubular body 43 arranged in such a manner that it is attached to the piston 42 and movable in the cavity 44 which tightly surrounds the body 43. The cavity 44 has four recesses 441, 442, 443 and 444 isolated from each other and arranged so that the recess 441 is connected to the air side 12 of the pressure equalizer 3, the recess 442 to the gas mixer 5, the recess 443 to the oxygen side 22 of the pressure equalizer 3 and the recess 444 to the gas mixer 5. The top end of the tubular body 43 is open whilst the bottom end is fully closed. The body 43 is provided with an inner wall 430 dividing the inner volume of the body into an upper and lower compartment. In the shell surface of the body 43 a number of dosing apertures 431 – 434 corresponding to the recesses 441 – 444 are provided so that communication can be established between on the one hand the recesses 441 and 442 and on the other hand the recesses 443 and 444. By means of displacement upwards or downwards of the body 43 the apertures 431 – 434 are opened or closed respectively to a greater or lesser extent, so that variable amounts of gas can pass from the pressure equalizer 3 to the gas mixer 5. The apertures 431 – 434 are arranged so that when the apertures 431 – 432 release more air the apertures 433 – 434 release less oxygen, so that the total amount of released gas is constant.

The embodiment shown in FIG. 3 has the main gas connection from the pressure equalizer 3 to the gas mixer 5 arranged so that the first recess 441 is in communication with the pressure equalizer 3 and the second recess 442 is in communication with the gas mixer 5. Naturally these communications may change place, so that the pressure equalizer 3 is connected to the second recess 442 and the gas mixer 5 to the first recess 441. In corresponding manner the connections shown in FIG. 3 for the auxiliary gas between the pressure equalizer 3 and the gas mixer 5 via the annular recesses 443 and 444 can change place, so that the connection from the pressure equalizer 3 is led to the fourth recess 444 and the connection with the gas mixer 5 is led from the third recess 443.

The movement of the tubular body 43 is controlled by the piston 42 which on the one side is acted upon by the atmospheric pressure surrounding the equipment plus spring force and on the other side by the gas pressure in the lines to the gas mixer 5, which gas pressure is proportional to the gas mixture pressure at the outlet 6.

The line 9 and the valves $V_1$, $V_2$ and $V_3$ have not been shown in FIG. 3 but can of course be included in the construction in the manner corresponding to what is shown in FIG. 2.

The gas mixer 5 appropriately has the form of a mixture meter in accordance with the realization proposed in Swedish Pat. No. 217,809. By this is obtained a visual representation of the percentage parts of the gases entering into the gas mixture. With this mixture meter it is also possible to provide the equipment with warning signals when the limit values are attained.

Various diving tests have been carried out with an equipment realized in accordance with that shown in FIG. 3. Among others a test was carried out in the diving tank to a depth of 24 metres for such a length of time that ascent by stages would normally have to be resorted to. In the tests performed, however, direct ascent took place without this giving rise to any disadvantage in the form of oxygen poisoning or divers' sickness of the test diver.

In the embodiments described above air was specified as the main gas and oxygen as the auxiliary gas, which gases are those customarily used. Regardless of this circumstance also other gases may be used with the equipment in accordance with the present invention. Thus the main gas may be a ready mixture of oxygen and helium. The auxiliary gas too may be constituted of previously mixed gases, so that the gas mixture to the diver consists of three or more gases.

As apparent from the above described embodiments, various modifications to the equipment are also possible within the scope of the invention. The invention should therefore not be considered as limited by what has been described above or what is shown in the drawings.

We claim:

1. A tubular diving equipment for supplying to an outlet a gas mixture consisting of a main gas and an auxiliary gas, comprising a first pressure controller for adjusting the pressure of the main gas, means for manually controlling said first pressure controller and means responsive to the gas pressure in the outlet for controlling said first pressure controller, a second pressure controller for adjusting the pressure of the auxiliary gas, means responsive to the pressure of the main gas at the outlet of the first pressure controller for controlling the second pressure controller, a pressure equalizer for equalizing the pressures of the two gases, means connecting the first and second pressure controllers, respectively, to respective sides of the pressure equilizer, a gas mixer, means for continuously feeding the main gas and the auxiliary gas separately from the pressure equilizer to the gas mixer, said last named means comprising first control valve means connected between one side of the pressure equalizer and the gas mixer for controlling the rate of flow of the main gas from the gas equilizer to the mixer and second control valve means connected between another side of the pressure equalizer and the gas mixer for controlling the rate of flow of the auxiliary gas from the equilizer to the mixer, and means responsive to the difference between the gas pressure in said outlet and the pressure of the surrounding medium for simultaneously controlling said first and second control valve means to control the ratio of the rates of flow of the two gases to the gas mixer.

2. Equipment in accordance with claim 1, characterized in that the control valve means have two control chambers with a piston disk in between them, the one side of the piston disk being acted upon by the pressure of the gas mixture and its other side by a spring force together with the atmospheric pressure surrounding the equipment.

3. Equipment in accordance with claim 2, characterized in that the piston disk on the side of the pressure of the gas mixture supports a tubular body with an open upper end portion and a closed lower end portion with a partition wall dividing the interior of the body into two compartments situated above one another, the body being movable within a cavity tightly surrounding the same with annular recesses separated from one another for the input and output of the main gas and auxiliary gas respectively, which annular recesses cooperate with input and output apertures cut out on the shell surface of the tubular body, so that the main gas is led from a first annular recess, which is connected to the pressure equalizer, via the open end of the body to the upper inner compartment of the body and a first output aperture to a second annular recess connected to the gas mixer and so that the auxiliary gas is led from a third annular recess, which is connected to the pressure equalizer, via a second input aperture to the lower inner compartment of the body and a second output aperture to a fourth annular recess connected to the gas mixer.

4. Equipment in accordance with claim 2, characterized in that the controller chambers are sealed from the cavity in which is located the tubular body, the part of the controller chamber which is acted upon by the pressure of the gas mixture being connected directly to the connection to the diver.

5. Equipment in accordance with claim 3, characterized in that the part of the controller chamber which is acted upon by the pressure of the gas mixture is constituted by the fourth annular recess of the cavity for the tubular body.

6. Equipment in accordance with claim 1 characterized in that for the main gas a duct provided with throttle is arranged for direct transmission of a small part of the main gas between the pressure equalizer and the gas mixer.

* * * * *